(12) United States Patent
Lim (10) Patent No.: US 8,771,864 B2
(45) Date of Patent: Jul. 8, 2014

(54) BATTERY MODULE

(75) Inventor: Young-Bin Lim, Yongin-si (KR)

(73) Assignees: Samsung SDI Co., Ltd., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 15 days.

(21) Appl. No.: 13/304,918

(22) Filed: Nov. 28, 2011

(65) Prior Publication Data

US 2012/0214046 A1 Aug. 23, 2012

Related U.S. Application Data

(60) Provisional application No. 61/445,765, filed on Feb. 23, 2011.

(51) Int. Cl.
*H01M 2/04* (2006.01)

(52) U.S. Cl.
USPC .............................. 429/159; 429/96; 429/160

(58) Field of Classification Search
USPC ..................................... 429/151, 96, 159, 160
See application file for complete search history.

(56) References Cited

U.S. PATENT DOCUMENTS

| | | | |
|---|---|---|---|
| 5,993,987 A | 11/1999 | Wozniczka et al. | |
| 6,218,039 B1 | 4/2001 | Mease et al. | |
| 6,761,992 B1 * | 7/2004 | Marukawa et al. | 429/96 |
| 2006/0269842 A1 * | 11/2006 | Ichinose et al. | 429/247 |
| 2008/0102345 A1 | 5/2008 | Andreas-Schott et al. | |
| 2008/0280194 A1 * | 11/2008 | Okada | 429/99 |
| 2011/0003230 A1 | 1/2011 | Ozgur | |
| 2012/0121950 A1 * | 5/2012 | Lim | 429/88 |

FOREIGN PATENT DOCUMENTS

| | | |
|---|---|---|
| EP | 0613201 A1 | 8/1994 |
| EP | 1772923 A2 | 4/2007 |
| EP | 2280442 A1 | 2/2011 |
| KR | 10-0232626 B1 | 9/1999 |
| KR | 10-2006-0085775 A | 7/2006 |

OTHER PUBLICATIONS

Extended European Search Report dated Jun. 5, 2012 for EP 12156264.9. (Lim).

* cited by examiner

*Primary Examiner* — Ula C Ruddock
*Assistant Examiner* — Frank Chernow
(74) *Attorney, Agent, or Firm* — Lee & Morse, P.C.

(57) ABSTRACT

A battery module includes a plurality of battery cells arranged in a first direction, a first end plate adjacent a first outermost battery cell of the plurality of battery cells, a second end plate adjacent a second outermost battery cell of the plurality of battery cells, the second end plate being spaced apart from the first end plate along the first direction, a connecting member extending along the plurality of battery cells in the first direction, the connecting member having a first end connected to the first end plate and a second end connected to the second end plate, a first securing portion securing the first end of the connecting member to the first end plate, and a second securing portion securing the second end to the second end plate, the second securing portion having a different configuration from the first securing portion.

19 Claims, 5 Drawing Sheets

BATTERY MODULE

CROSS-REFERENCE TO RELATED APPLICATION

The present application claims priority under 35 U.S.C. §119(e) to U.S. Provisional Application No. 61/445,765, filed on Feb. 23, 2011, and entitled: "Battery Module," which is incorporated herein by reference in its entirety.

BACKGROUND

1. Field

Embodiments relate to a battery module including a plurality of battery cells.

2. Description of the Related Art

Battery cells are generally used as energy sources for mobile devices, electric vehicles, hybrid vehicles, and electricity and are used in various shapes, depending on the types of applied external electronic devices.

Small mobile devices, such as mobile phones, can operate for a predetermined time with output and capacity of a single battery. However, battery modules including a plurality of battery cells are preferred for long-time operation and high-power operation, such as electric vehicles and hybrid vehicles that consume a large amount of power and the output voltage and output current of the battery modules can be increased, depending on the number of built-in battery cells.

The battery modules include a plurality of battery cells in consideration of the output voltage and current. However, the battery modules should be accommodated in as small a space as possible, such that improving mounting efficiency is desired.

SUMMARY

Embodiments may provide a battery module. The battery module may include a plurality of battery cells arranged in a first direction, a first end plate adjacent a first outermost battery cell of the plurality of battery cells, a second end plate adjacent a second outermost battery cell of the plurality of battery cells, the second end plate being spaced apart from the first end plate along the first direction, a connecting member extending along the plurality of battery cells in the first direction, the connecting member having a first end connected to the first end plate and a second end connected to the second end plate, a first securing portion securing the first end of the connecting member to the first end plate, and a second securing portion securing the second end to the second end plate, the second securing portion having a different configuration from the first securing portion.

The first securing portion may include a first weld securing the first end plate and the first end of the connecting member.

The second securing portion may include a second weld securing the second end to the second end plate.

The second securing portion may include a fastener securing the second end to the second end plate.

The first end of the connecting member may extend in a plane parallel to an exposed surface of the first end plate, opposite a surface of the first end plate adjacent the first outermost battery cell of the plurality of battery cells.

The battery module may further include a first end plate alignment mark that protrudes from the exposed surface of the first end plate along the first direction. The first end may include a hole configured to receive the first end plate alignment mark. The first securing portion may include a weld securing the first end plate alignment mark to the first end of the connecting member.

The connecting member may include two side connecting members along opposing sides of the plurality of battery cells.

The connecting member may include a bottom connecting member extending along a bottom of the plurality of battery cells.

The second end of the connecting member may extend along the first direction beyond an exposed surface of the second end plate, opposite a surface of the second end plate adjacent the second outermost battery cell of the plurality of battery cells.

The second securing portion may include a protrusion extending from the exposed surface of the second end plate along the first direction. The second securing portion may include a weld securing the second end to the protrusion. The second end may include a second end alignment mark and the protrusion includes a second end plate alignment mark. The second end alignment mark and the second end plate alignment mark may form a channel configured to receive a fastener.

The second securing portion may include a flange extending from a bottom of an exposed surface of the second end plate, opposite a surface of the second end plate adjacent the second outermost battery cell, along the first direction.

The second securing portion may include a fastening member extending from the second end along a second direction orthogonal to the first direction.

The second securing portion may include a guide formed in the bottom of the exposed surface of the second end plate and in the flange, the guide being configured to accommodate the fastening member. The guide may decrease in width in the flange along the first direction such that a width of the guide furthest from the second end plate corresponds to a width of the fastening member.

The battery module may include a fixing member secured to the fastening member.

BRIEF DESCRIPTION OF THE DRAWINGS

Features of embodiments will become more apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Further, connection of a part with another part includes direct connection and electric connection of the parts with another device therebetween. Further, the parts not related to embodiment may be omitted for clarity. Like components are given like reference numerals throughout the specification.

Figure 1:
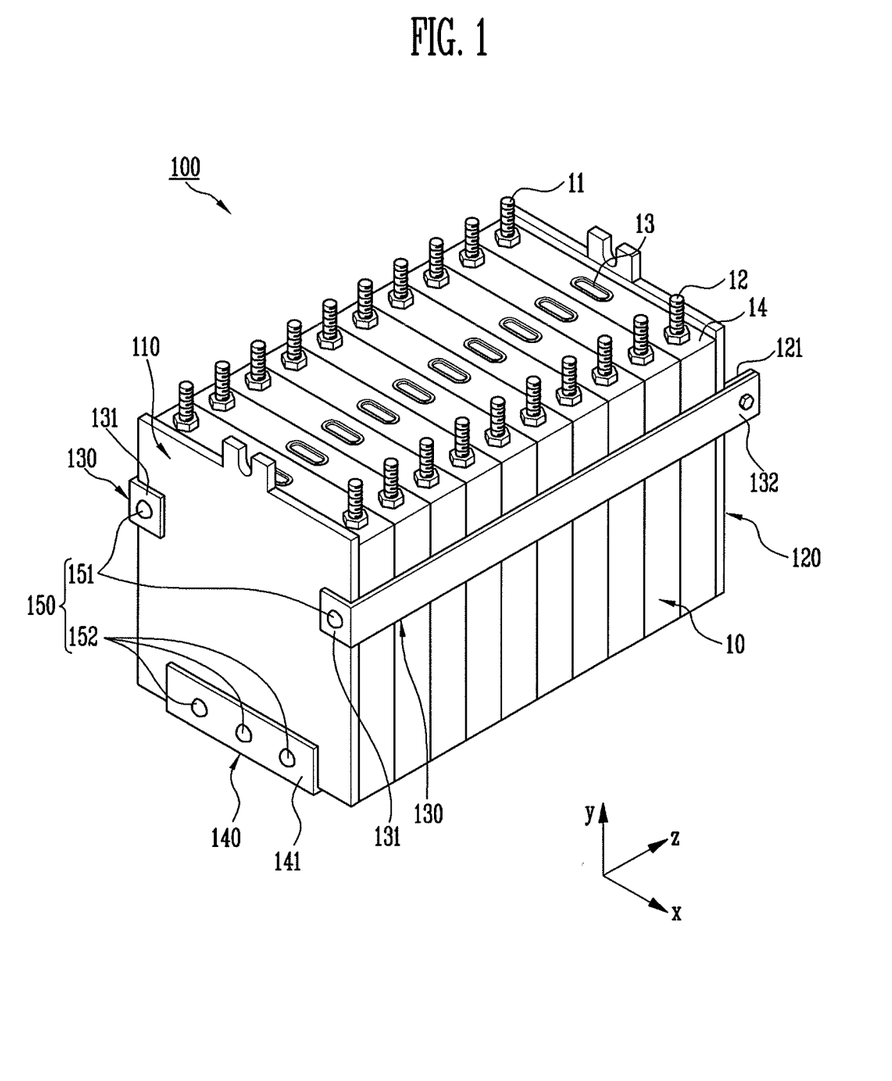
FIG. 1 illustrates a perspective view of a battery module according to an embodiment.
Figure 2:
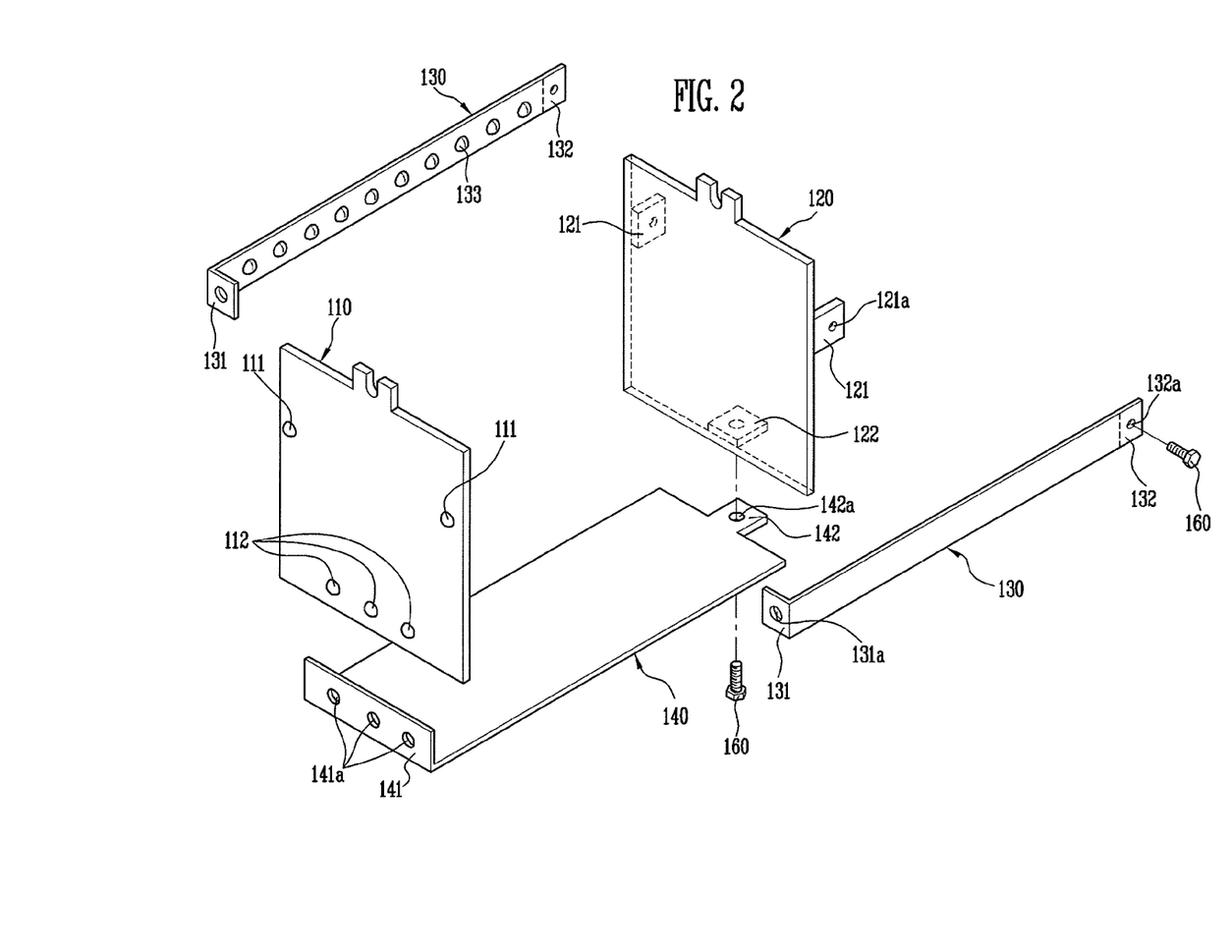
FIG. 2 illustrates an exploded perspective view of first and second end plates, side brackets, and a bottom bracket of an embodiment.

A battery module according to an embodiment is described with reference to FIGS. 1 and 2. FIG. 1 illustrates a perspective view of a battery module according to an embodiment. FIG. 2 illustrates an exploded perspective view of first and second end plates, side brackets, and a bottom bracket of the battery module of FIG. 1.

Referring to FIG. 1, a battery module 100 may include first and second end plates 110 and 120 opposite to each other, a plurality of battery cells 10 arranged in one direction between the first and second end plates 110 and 120, and connecting members connecting the first and second end plates 110 and 120.

The connecting members may be brackets. The brackets may include side brackets 130 supporting both sides of the battery cells 110 and a bottom bracket 140 having one end, which is connected to the first end plate 110, and supporting the bottoms of the battery cells 10.

The battery cell 10 may include a battery case with an opening and a cap plate 14 closing the opening. The battery case may accommodate an anode plate, a cathode plate, an electrode assembly including a separator disposed between the plates, and an electrolyte. An anode terminal 11 connected with the anode plate and a cathode terminal 12 connected with the cathode plate protrude outward from both ends of the cap plate 14. The anode plate and the cathode plate produce energy by reacting with the electrolyte that is transmitted to the outside through the anode terminal 11 and the cathode terminal 12.

A vent 13 may be disposed between the anode terminal 11 and the cathode terminal 12 of the cap plate 14. The vent 13 functions as a channel for discharging gas to the outside, when the pressure of the gas in the battery cell 10 is above a predetermined level, thereby preventing the battery cell 10 from being damaged by internal pressure.

The battery module 100 according to this embodiment may include a plurality of battery cells 10 between the first and second end plates 110 and 120. The battery cells 10 may be arranged in one direction. The wide front surfaces of the battery cells 10 may be arranged in parallel to face each other. Therefore, the vents 13 at the center of the cap plates 14 of the battery cells 10 may be arranged substantially in a line. The anode terminal 11 and the cathode terminal 12 of two adjacent battery cells 10 may be electrically connected through a bus-bar (not shown) made of, e.g., nickel, etc.

This embodiment exemplifies when the battery cells 10 are rectangular lithium secondary batteries. Alternatively, embodiments may be used, e.g., with lithium polymer batteries or cylindrical batteries.

The battery module 100 may include a pair of first and second end plates 110 and 120 that are spatially spaced apart from each other, side brackets 130 connecting the left and right sides of the first and second end plates 110 and 120, and a bottom bracket 140 connecting the bottoms of the first and second end plates 110 and 120. A plurality of battery cells 10 may be arranged between the first and second end plates 110 and 120.

The first and second end plates 110 and 120 may be disposed in surface contact with the outermost battery cells 10, respectively, and press inward the battery cells 10. Further, the side brackets 130 support both sides of the battery cells 10 and the bottoms of the battery cells 10 may be supported by the bottom bracket 140. In this configuration, the battery cells 10 supported by the first and second end plates 110 and 120, the side bracket 130, and the bottom bracket 140 have the anode terminals 11 and the cathode terminals 12, which may be alternately arranged and connected in series with each other in the battery cells. Further, the connection structure and the number of battery cells 10 may be changed in various ways in accordance with the design of the battery module 100.

The first end plate 110 may be connected with ends of the side brackets 130 and the bottom bracket 140. In detail, ends 131 of the two side brackets 130 connected to the left and right sides of the first end plate 110 may form a first connection portion 151 by being connected with the left and right sides of the first end plate 110, respectively. Further, one end 141 of the bottom bracket 130 may form a second connecting portion 152 by being connected with the lower portion of the first end plate 110. The first and second connecting portions 151 and 152 may be formed by laser welding or arc welding.

In this embodiment, a specific member is not needed to connect the first end plate 110 with the side brackets 130 and the bottom bracket 140. Therefore, since it is possible to firmly connect the first end plate 110 with ends of the side brackets 130 and the bottom bracket 140, without using bolt or rivets, the manufacturing process may be simplified and some components, e.g., bolts, may be eliminated, thereby reducing the weight of the battery module 100.

FIG. 2 illustrates first and second end plates, side brackets, and a bottom bracket according to an embodiment.

The connecting portion 150 composed of the first and second connecting portions 151 and 152 is described with reference to FIG. 2. The first end plate 110 may include first and second align marks 111 and 112. The first and second align marks 111 and 112 are portions that form the connecting portion 150 (see FIG. 1) by welding the side brackets 130 with the bottom bracket 140. Further, holes 131a and 141a may be formed, respectively, at a first end 131 of the side brackets 130 and a first end 141 of the bottom bracket 140. The holes 131a and 141a are preferably formed to correspond to the first and second align marks 111 and 112.

The first align mark 111 is disposed in advance where the side bracket 130 is to be connected to the first end plate 110. For example, the first align mark 111 may be a protrusion and the protrusion may be inserted in the hole at the first end 131 of the side bracket 130. Similarly, the second align mark 112 may be, for example, a protrusion. The second align mark 112 may be three protrusions, and three holes 141a, respectively corresponding to the three protrusions 112, may be formed at the first end 141 of the bottom bracket 140. The protrusions are inserted in the corresponding holes 141a and guide the position of the bottom bracket 140.

As described above, the first and second align marks 111 and 112 can guide the attachment positions of the side brackets 130 and the bottom bracket 140, such that the side brackets 130 and the bottom brackets 140 can be easily attached to predetermined positions of the first end plate 110. On the contrary, as described above, the connection by the first and second align marks 111 and 112 are not firm, such that it is not sufficient to support the battery cells 10 in the battery module 100. Therefore, the first and second align marks 111 and 112 where the protrusions are inserted may be further welded, and the connecting portion 150 can be more firm by the welding.

Further, the first and second align marks 111 and 112 and the protrusions only have to be positioned to correspond to each other, such that the number and shape of the first and second align marks 111 and 112 may be changed in various ways.

The side brackets 130 and the bottom bracket 140 may also have second ends 132, 142, spaced from the first ends 131, 141 along the z direction, where the connecting portion 150 is fastened to the second end plate 120. The second end 132 of the side brackets 130 may be an extending portion 132 that extends beyond, e.g., be longer in the z direction than, sides of the battery cells 10 arranged in one direction, i.e., the z direction. Further, the extending portions 132 may correspond to flanges 121 extending from left and right sides of the second end plate 120. Similarly, the second end 142 of the bottom bracket 140 may be an extending portion 142 that extends beyond, e.g., longer in the z direction than, a bottom of the battery cells 10. The extending portion 142 of the bottom bracket 140 may correspond to a flange 122 extending from the bottom of the second end plate 120. Further, the extending portions 132 and 142 of the side brackets 130 and the bottom bracket 140 may overlap at least a portion of the flanges 121 and 122 bending at the edges of the left and right sides and the bottom of the second end plate 120, in surface contact with the portions.

Further, holes 132a and 142a may be formed at the extending portions 132 and 142, respectively, of the side brackets 130 and the bottom bracket 140. It is preferable that the holes 132a, 142a are positioned to correspond to, e.g., align with, the holes 121a and 122a in the flanges 121 and 122 of the second end plate 120. The holes 132a and 142a in the extending portions 132 and 142 of the side brackets 130 and the bottom bracket 140, and the holes 121a and 122a in the flanges 121 and 122 of the second end plate 120, may form one channel that may be used to receive a fastener 160, e.g., a rivet or a bolt, respectively. In this configuration, the portion where the fastener 160 is fastened may be further welded in order to more firmly fasten the side brackets 130, the bottom bracket 140, and the second end plate 120.

Alternatively, holes may not be formed at the extending portions 132 and 142 of the side brackets 130 and the bottom bracket 140 and the flanges 121 and 122 of the second end plate 120. In this case, the side brackets 130, the bottom bracket 140, and the second end plate 120 may be connected by welding. The welding may be laser welding or arc welding, for example.

Shapes of the extending portions 132 and 142 of the side brackets 130 and the bottom bracket 140 may correspond to the flanges 121 and 122 of the second end plate 120. The extending portions 132 and 142 and the flanges 121 and 122 have only to be connected and fix the side brackets 130 and the bottom bracket 140 to the second end plate 120, such that the shapes are not limited thereto. However, when the extending portions 132 and 142 correspond to the flanges 121 and 122, they may serve as a guide for assembling the battery module 100, such that productivity can be improved.

Further, the side bracket 130 may further have supporting portions 133. The supporting portions 133 may support the left and right sides of the battery cell 10 on the inner side of the side bracket 130. The battery cells 10 can be more firmly fixed between the first and second end plates 110 and 120 by the supporting portions 133. For example, the supporting portions 133 may be ribs or beads corresponding to the sides of the battery cells 10.

A battery module according to another embodiment is described with reference to FIGS. 3A to 4. The configuration of this embodiment is similar to that described with reference to FIGS. 1 and 2, except for the following configuration, such that the detailed description is not repeated hereafter.

Figure 3A:
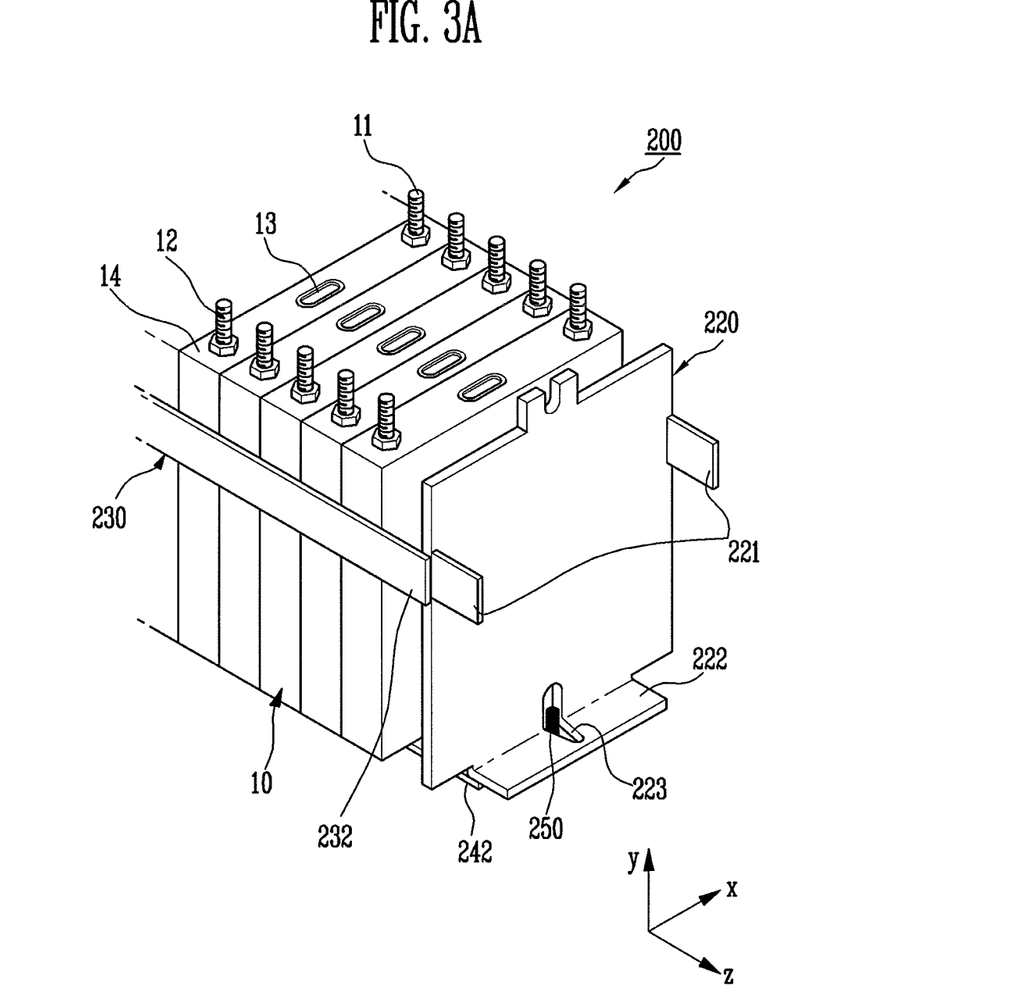
FIGS. 3A and 3B illustrate partial perspective views of a battery module according to an embodiment.
Figure 3B:
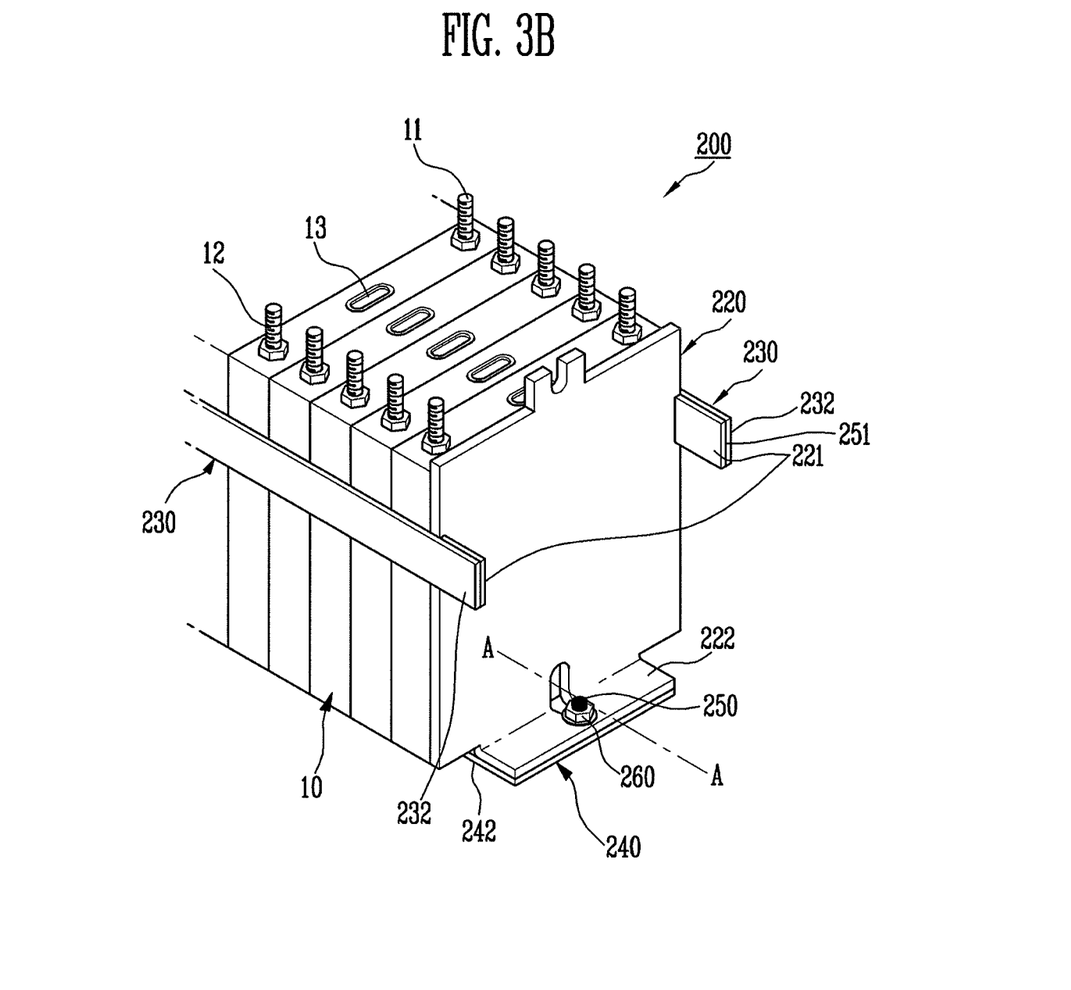

FIGS. 3A and 3B illustrate partial perspective views of a battery module 200 according to another embodiment. FIG. 3A illustrates the battery module 200 before a second end plate 220 is pressed thereon and FIG. 3B illustrates the battery module 200 after the second end plate 220 is pressed thereon.

Referring to FIGS. 3A and 3B, the battery module 200 according to this embodiment includes: a first end plate (not shown) and a second end plate 220 opposite to each other in a pair; a plurality of battery cells 10 arranged in one direction between the first and second end plates 220; side brackets 230 connected to the first and second end plates 220 and supporting both sides of the battery cells 10; and a bottom bracket 240 having one end, which is connected to the first end plate, and supporting the bottoms of the battery cells 10. Further, a fastening member 250 may be disposed at the other end of the bottom bracket 240 and a guide 223 may be formed at the second end plate 220, corresponding to the fastening member 250.

FIGS. 3A and 3B illustrates when the battery cells 10 are arranged in one direction and the second end plate 220 is pressed on the outermost sides of the battery cells 10, with the side brackets 230 and the bottom bracket 240 connected to the first end plate (not shown).

The bottom bracket 240 of this embodiment may further have the fastening member 250. For example, fastening members 250, e.g., a stud, may be disposed at an extending portion 242 of the bottom bracket 240. Further, the second end plate 220 may have the guide 223. The guide 223 may be formed across the bottom of the second end plate 220 and the flange 222. The flange 222 is a portion bending at the edge of the bottom of the second end plate 220 and may be in surface contact with a portion of the extending portion 242 of the bottom bracket 240.

The guide 223 may be formed in a hole shape, for example. The guide 223 may have a shape corresponding to the fastening member 250 of the bottom bracket 240. That is, after the second end plate 220 is pressed, the extending portions 232 and 242 of the side brackets 230 and the bottom bracket 240 are connected with the flanges 221 and 242 extending from edges of the left and right sides and the bottom of the second end plate 220. In this configuration, the second end plate 220 may be first connected with the bottom bracket 240, in order to easily fix the second end plate 220 to the side brackets 230 and the bottom bracket 240.

In general, the second end plate 220 and the bottom bracket 240 may be connected by bolts and nuts. As described above, when bolts and nuts are used, the extending portion of the bottom bracket may have a stepped portion with respect to the portions around the heads of the bolts inserted in the lower portion, such that it may be difficult to align the centers.

In contrast, in accordance with the present embodiment, the fastening member 250, such as a stud, may be disposed at the extending portion 242 of the bottom bracket 240. The stud can be inserted and manufactured in the extending portion 242 of the bottom bracket 240, such that a specific bolt is not required and the stepped portion for accommodating the head of the bolt, described above, is not needed.

Further, the second end plate 220 may have the guide 223 at the position corresponding to the fastening member 240 of the bottom bracket 240. The guide 223 guides the position when the battery cells 10 are pressed by the second end plate 220 to facilitate assembling the battery module 200.

Further, the battery module 200 may further include a fixing member 260. The fixing member 260 has a hole through which the fastening member 250 of the bottom bracket 240 passes. After the fixing member has been secured to the fastening member 250, the extending portions 232 of the side brackets 230 and the flanges 221 of the second end plate 220 may be secured, e.g., by a weld 251.

Figure 4:
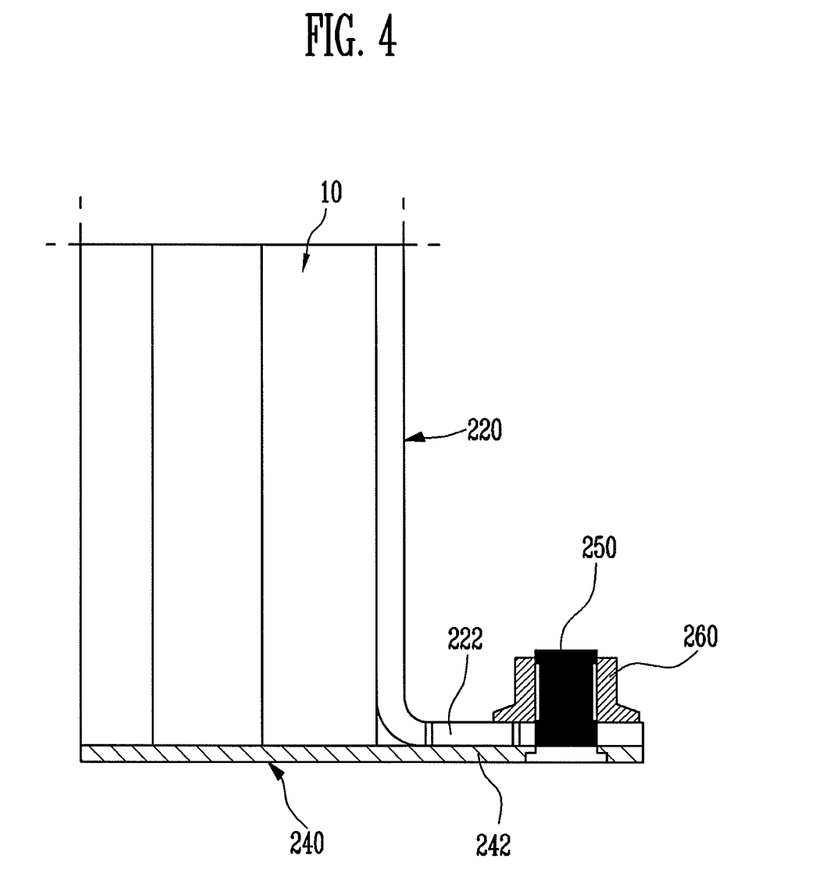
FIG. 4 illustrates a cross-sectional view taken along the line A-A of FIG. 3B.

FIG. 4 illustrates a cross-sectional view taken along the line A-A of FIG. 3B.

Referring to FIG. 4, the guide 223 may be provided to prevent interference with the fastening member 250 of the bottom bracket 240, when the battery cells 10 are pressed to the second end plate 220. The guide 223 may be formed to the flange 222, across the bottom of the second end plate 220.

In this case, the shape of the guide 223 at the bottom of the second end plate 220 may correspond to the vertical cross-section of the fastening member 250 of the bottom bracket 240. Further, the guide 223 of the flange 222 may correspond to the horizontal cross-section of the fastening member 250.

The guide 223 of the flange 222 may be tapered. The guide 223 at the flange 222 may gradually decrease in width at the edge of the bottom of the second end plate 220, in which the smallest tapered width may correspond to the horizontal cross-section of the fastening member 250. As described above, the tapered guide 223 of the flange 222 functions as a guide preventing left and right assembly tolerance when the second end plate 220 is pressed, such that the battery module 220 is more easily assembled, improving productivity.

Further, the battery module 200 may further include the fixing member 260. The fixing member 260 has a hole through which the fastening member 250 of the bottom bracket 240 passes. The battery module 200 according to this embodiment can firmly connect the second end plate 220 with the bottom bracket 240, by passing the fastening member 250 protruding through the guide 223, through the hole of the fixing member 260. For example, the fixing member 260 may be a nut.

According to embodiments described above, working time may be reduced by simplifying the manufacturing process, improving productivity.

Further, according to embodiments, a number of parts, such as bolts, may be reduced, such that it is possible to reduce the manufacturing cost of a battery module.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
a plurality of battery cells arranged in a first direction;
a first end plate adjacent to a first outermost battery cell of the plurality of battery cells;
a second end plate adjacent to a second outermost battery cell of the plurality of battery cells, the second end plate being spaced apart from the first end plate along the first direction;
a connecting member extending along the plurality of battery cells in the first direction, the connecting member having a first end connected to the first end plate and a second end connected to the second end plate, the first end of the connecting member extending in a plane parallel to an exposed surface of the first end plate, the exposed surface of the first end plate being a surface that faces in an opposite direction from a surface of the first end plate adjacent to the first outermost battery cell of the plurality of battery cells, and the first end of the connecting member wraps around the end plate to contact the exposed surface of the first end plate;
a first securing portion securing the first end of the connecting member to the first end plate; and
a second securing portion securing the second end to the second end plate, the second securing portion having a different configuration from the first securing portion.

2. The battery module as claimed in claim 1, wherein the first securing portion includes a first weld securing the first end plate and the first end of the connecting member.

3. The battery module as claimed in claim 2, wherein the second securing portion includes a second weld securing the second end to the second end plate.

4. The battery module as claimed in claim 2, wherein the second securing portion includes a fastener securing the second end to the second end plate.

5. The battery module as claimed in claim 1, further comprising a first end plate alignment mark that protrudes from the exposed surface of the first end plate along the first direction.

6. The battery module as claimed in claim 5, wherein the first end includes a hole configured to receive the first end plate alignment mark.

7. The battery module as claimed in claim 6, wherein the first securing portion includes a weld securing the first end plate alignment mark to the first end of the connecting member.

8. The battery module as claimed in claim 1, wherein the connecting member includes two side connecting members along opposing sides of the plurality of battery cells.

9. The battery module as claimed in claim 8, wherein the connecting member includes a bottom connecting member extending along a bottom of the plurality of battery cells.

10. The battery module as claimed in claim 1, wherein the second end of the connecting member extends along the first direction beyond an exposed surface of the second end plate, opposite a surface of the second end plate adjacent to the second outermost battery cell of the plurality of battery cells.

11. The battery module as claimed in claim 10, wherein the second securing portion includes a protrusion extending from the exposed surface of the second end plate along the first direction.

12. The battery module as claimed in claim 11, wherein the second securing portion includes a weld securing the second end to the protrusion.

13. The battery module as claimed in claim 12, wherein the second end includes a second end alignment mark and the protrusion includes a second end plate alignment mark.

14. The battery module as claimed in claim 13, wherein the second end alignment mark and the second end plate alignment mark form a channel configured to receive a fastener.

15. The battery module as claimed in claim 1, wherein the second securing portion includes a flange extending from a bottom of an exposed surface of the second end plate, opposite a surface of the second end plate adjacent the second outermost battery cell, along the first direction.

16. The battery module as claimed in claim 15, wherein the second securing portion includes a fastening member extending from the second end along a second direction orthogonal to the first direction.

17. The battery module as claimed in claim 16, wherein the second securing portion includes a guide formed in the bottom of the exposed surface of the second end plate and in the flange, the guide being configured to accommodate the fastening member.

18. The battery module as claimed in claim 17, wherein the guide decreases in width in the flange along the first direction such that a width of the guide furthest from the second end plate corresponds to a width of the fastening member.

19. The battery module as claimed in claim 18, further comprising a fixing member secured to the fastening member.

* * * * *